INTERCHANGEABLE CHASSIS SLIDES FOR CARRYING ELECTRONIC EQUIPMENT

Filed Aug. 5, 1959 3 Sheets-Sheet 1

INVENTORS
LOUIS DANO
ROGER VIGUIE

BY Fred C. Hushnell
AGENT

June 22, 1965 L. DANO ETAL 3,191,097

INTERCHANGEABLE CHASSIS SLIDES FOR CARRYING ELECTRONIC EQUIPMENT

Filed Aug. 5, 1959 3 Sheets-Sheet 2

INVENTORS
LOUIS DANO
ROGER VIGUIE

BY [signature]

AGENT

June 22, 1965 L. DANO ETAL 3,191,097

INTERCHANGEABLE CHASSIS SLIDES FOR CARRYING ELECTRONIC EQUIPMENT

Filed Aug. 5, 1959 3 Sheets-Sheet 3

INVENTORS
LOUIS DANO
ROGER VIGUIÉ

BY

AGENT

United States Patent Office 3,191,097
Patented June 22, 1965

3,191,097

INTERCHANGEABLE CHASSIS SLIDES FOR CARRYING ELECTRONIC EQUIPMENT

Louis Dano, La Plaine Saint-Denis, and Roger Viguié, Gif-sur-Yvette, France, assignors to Commissariat a l'Energie Atomique, Paris, France, an organization of France Filed Aug. 5, 1959, Ser. No. 831,755
Claims priority, application France, Aug. 19, 1958, 772,723
6 Claims. (Cl. 317—101)

It is of primary importance to mount electronic equipment in such manner as to reduce servicing to a minimum. For this purpose, various arrangements have already been suggested, in particular that described in the French Patent No. 1,117,304 in the name of Commissariat a l'Energie Atomique for: "Improvements Brought to Electronic Apparatus." Such arrangements include interchangeable chassis slides for carrying electronic equipment, but the slides used up to the present time are relatively heavy because they have been made for carrying cables, relatively big electronic tubes, etc.

The object of the present invention is to provide a rack or cabinet for housing electronic equipment, especially intended for new light electronic elements such as printed circuits, transistors, miniature and subminiature tubes.

According to our invention, such a rack or cabinet includes a plurality of chassis slides, every slide consisting essentially of at least one girder extending in the direction of movement of the slide with respect to the frame of the rack or cabinet, this girder being adapted to support a portion of said equipment, said slide being fixed in operative position, at the end of its inward movement with respect to said frame, by the mutual engagement of the contact means of a connector female element with those of a connector male element, one of said connector elements being fixed to said frame and the other to said girder.

Preferred embodiments of the present invention will be hereinafter described with reference to the accompanying drawings, given merely by way of example and in which:

FIG. 1 is a perspective view of a slide made according to the present invention, this slide being shown opposite the parts by which it is supported.

FIG. 1*a* separately shows a portion of this slide in vertical section.

Figure 1A:
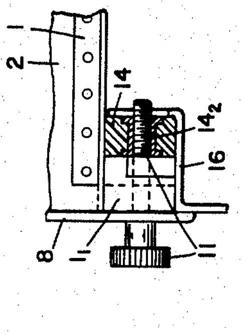
Figure 1:
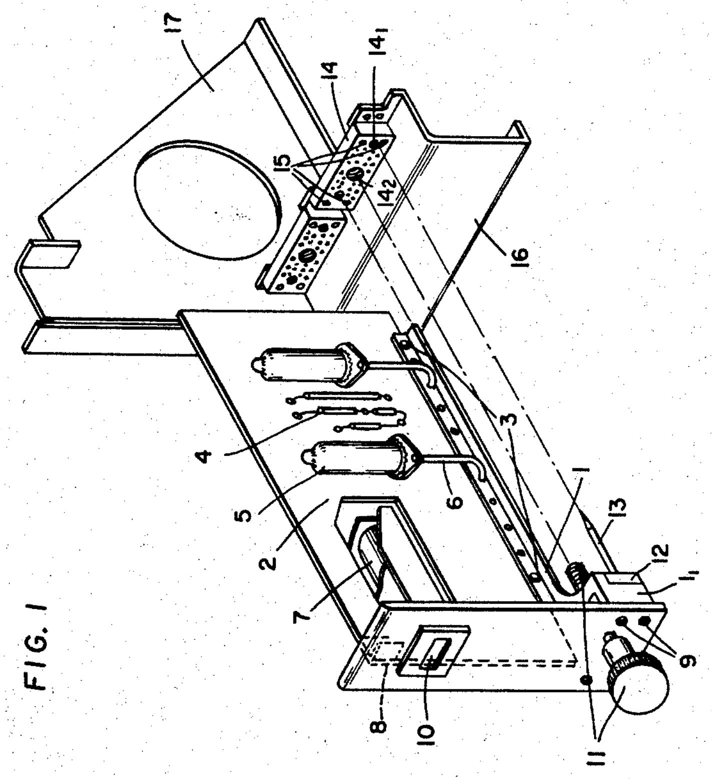

FIG. 1 shows the girder 1 which constitutes the main element of a slide. This girder is advantageously made by molding under pressure of a light alloy or a plastic material and it is possibly provided with reinforcements. This girder carries the following elements:

(a) A vertical plate 2 of an insulating material fixed by screws 3 on girder 1 and on which are mounted the various electronic components such as 4, 5 and 7; some of these components, such as tube 5, of greater dimensions, may be supported by brackets such as 6, whereas other elements such as 7 may be directly carried by a front panel 8 mounted on girder 1;

(b) This front panel 8, fixed by screws 9 on a head portion $1_1$ of the girder; apparatus 7, which is carried by this panel, is visible through a transparent window 10; this panel 8 is provided with a passage for a locking screw 11 which will be hereinafter referred to;

(c) A male connector element 12 fixed by screws (not visible on the drawing), including for instance 24 contacts and carrying two guiding pins such as 13 adapted to engage in corresponding holes $14_1$ of the female connector element 14, so as thus to guide the slide.

The male connector element 12 is provided with a passage for locking screw 11, which has a great pitch, said screw permitting, in addition to the handling of the slide, of placing the two connector elements in mutual engagement with each other. It further permits of locking the slide with respect to the fixed portion of the structure.

The female connector element 14, which includes a nut $14_2$ adapted to cooperate with screw 11, is fixed by screws 15 on a light alloy part 16 which supports eight similar connector elements and is itself held by two side plates such as 17.

Figures 2, 4:
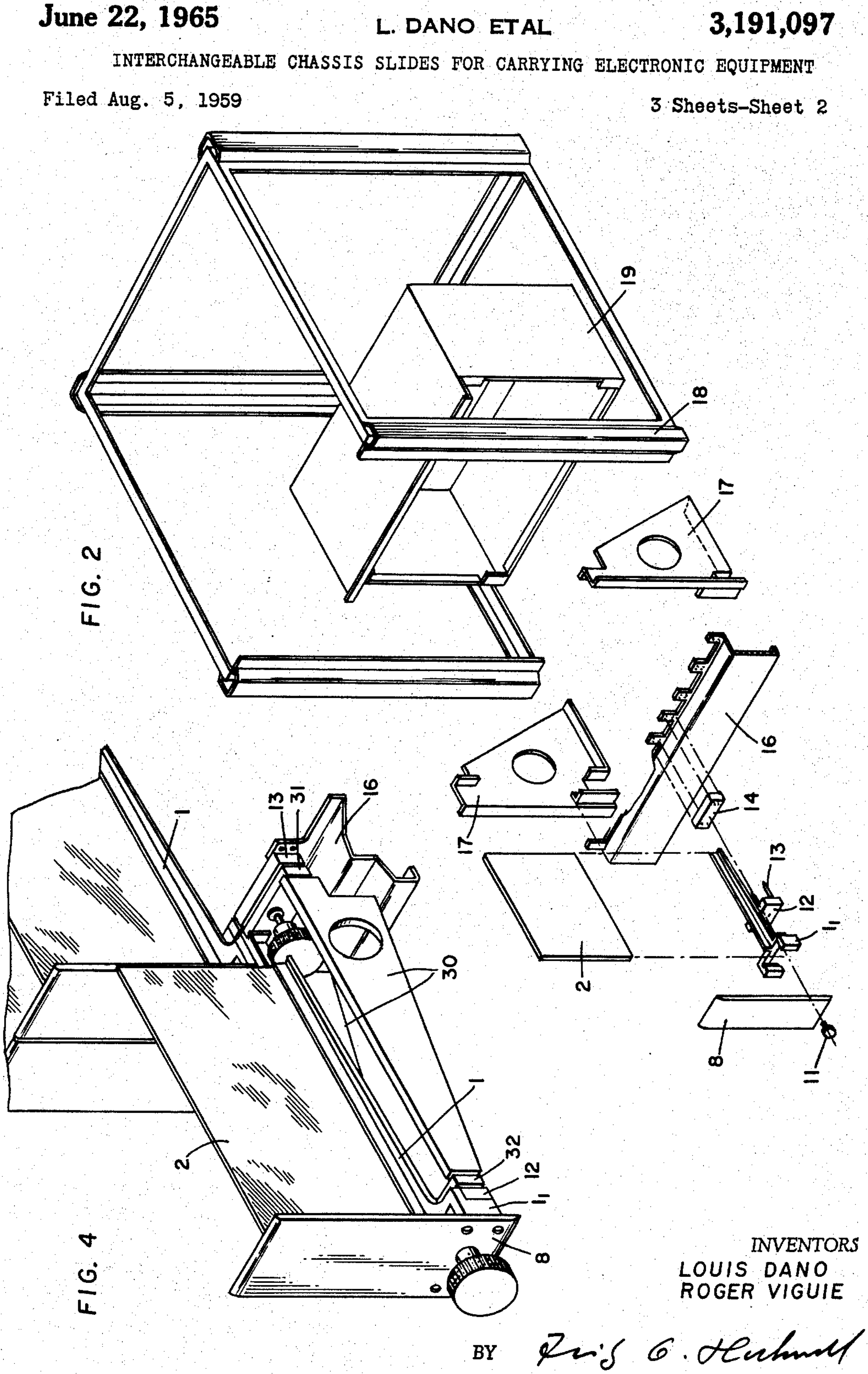
FIG. 2 is an exploded view showing the various elements of the rack.
FIG. 4 is a perspective view of a slide provided with an extension permitting direct access to the electronic equipment carried by said slide.

FIG. 2 shows girder 1, insulating plate 2, the front panel 8, locking screw 11, the male connector element 12 and the female connector element 14 supported by front wall 16, itself supported by side plates 17 and forming therewith part of the frame supporting the girder 1. These side plates are screwed on the uprights 18 of the rack intended to contain the electronic equipment. A shield 19 may be mounted on side plates 17 to protect the whole against electrical perturbations and dust.

Figure 3:
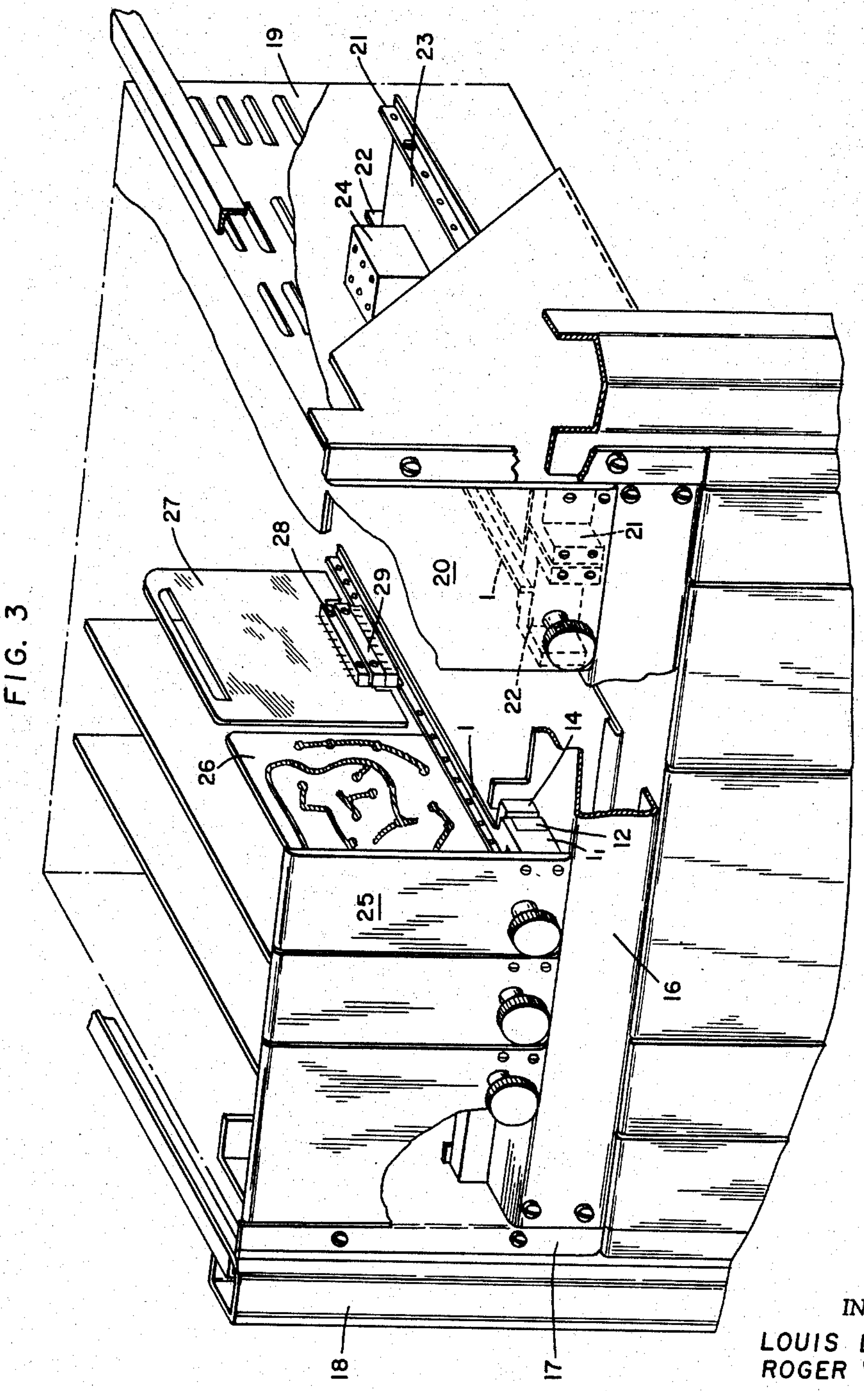
FIG. 3 shows a cabinet or rack provided with various slides according to the invention.

FIG. 3 shows several slides according to the invention inserted in a rack in operative position. Some slides may be of a width which is a multiple of that of the normal slides, and in this case they include a greater number of girders, said girders being however always of the same shape and dimensions for all the slides whether there is only one girder for one slide or several girders for a single slide. For instance, slide 20 is a slide of double width. It carries a single connector but two girders 21 and 22 (shown in dotted lines on FIG. 3) similar to girder 1. They are connected together by a chassis 23 which supports the electronic components of relatively big size, such as 24. We may use slides of different heights (for instance of three different heights).

Slide 25 includes a vertical plate 26 corresponding to plate 2 above described and on which are printed the circuits to be used. It further includes a removable plate 27 fixed to the slide through a connector including a male connector element 28 fixed to plate 27 and a female connector element 29 fixed to the girder. This arrangement makes it possible to work on some of the circuits of slide 25 without stopping the operation of the others.

FIG. 4 shows a slide similar to that of FIG. 1 but further including two arms 30 which form a bridge between the male connector element 31 and the female connector element 32 through electric cables (not shown). Under normal conditions of operation, the male connector element 12 cooperates directly with the female connector element 13. When it is necessary to have direct access to the slide and the electronic component it carries, the male connector element 31 is engaged with connector 13 and the female connector element 32 is engaged with the male connector element 12, thus maintaining the electrical connections between parts 12 and 13 while keeping plate 2 on the outside of the rack. Thus, the electronic components carried by said plate 2 are accessible while being connected with the electric circuits.

According to the invention, slides which have been extracted from the rack can easily be introduced by the operator into proper position without this introduction requiring a particular attention or a special guiding. It is only when the slide is close to its operative position that the operator must take care to introduce guiding pins 13 into holes $14_1$. When the slide is in its final position and electric contacts have been made between the male and female connector elements 12 and 14, locking of the slide is obtained by means of screws 11 cooperating with nut $14_2$.

The handling of such slides is therefore very simple. Furthermore, as the female connectors are at the front, the cables are readily accessible.

As the only holding, guiding and positioning part of the slide is its girder, large tolerances may be admitted for the manufacture of the elements. The slide is simple and of light weight and its cost is low. It may easily be used in portable arrangements.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A rack for housing electric equipment which comprises, in combination, a frame having a front wall, a plurality of slides to be mounted in said frame, each of said slides including a girder to be secured to said frame in a position where said girder extends in a direction transverse to said wall, electric equipment supporting means carried by said girder, and at least one multi-contact connector including two elements, a female one and a male one, adapted slidably to engage each other along respective cooperating guiding surfaces thereof, one of said elements being carried by said frame front wall, and its guiding surface extending in said transverse direction, the other of said elements being carried by said girder at the front part thereof and extending rearwardly from said front part, said last mentioned element being of a length which is a fraction of the length of said girder, said elements being the only means for guiding the corresponding slide with respect to said frame.

2. A rack according to claim 1 further including at least one pin parallel to the longitudinal direction of said girder and fixed to said male connector element, said female connector element being provided with a hole adapted to accommodate said pin so as to guide said two connectors with respect to each other before their mutual engagement.

3. A rack according to claim 1 further including a screw mounted at the front end of said girder and extending through said male connector element in a direction parallel to its longitudinal dimension, said female connector element being provided with a screw-threaded hole to cooperate with said screw for locking said slide with respect to said frame.

4. A rack according to claim 1 wherein said electric equipment supporting means is a vertical plate carried by said girder.

5. A rack according to claim 1, said plate carrying a printed circuit.

6. A rack according to claim 1 further including another girder parallel to the first one and a chassis connecting said two girders together.

References Cited by the Examiner

UNITED STATES PATENTS

| | | | |
|---|---|---|---|
| 1,611,215 | 12/26 | McArthur | 174—52 |
| 2,820,875 | 1/58 | Werych | 317—101 |
| 2,824,264 | 2/58 | Anastopoulos | 317—101 |
| 2,910,627 | 10/59 | Matteson | 317—101 |

FOREIGN PATENTS

| | | |
|---|---|---|
| 714,125 | 11/31 | France. |
| 203,624 | 6/56 | Australia. |
| 213,875 | 11/57 | Australia. |
| 805,175 | 12/58 | Great Britain. |

JOHN F. BURNS, *Primary Examiner.*

SAMUEL BERNSTEIN, JOHN P. WILDMAN, E. JAMES SAX, *Examiners.*